United States Patent
Giokaris et al.

(10) Patent No.: US 11,032,537 B2
(45) Date of Patent: *Jun. 8, 2021

(54) MOVABLE DISPLAY FOR VIEWING AND INTERACTING WITH COMPUTER GENERATED ENVIRONMENTS

(71) Applicant: Athanos, Inc., Pomona, CA (US)

(72) Inventors: Peter Giokaris, Pomona, CA (US); Michael Zyda, Los Angeles, CA (US); Joseph Sardone, Watertown, MA (US)

(73) Assignee: Athanos, Inc., Pomona, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/885,029

(22) Filed: May 27, 2020

(65) Prior Publication Data
US 2020/0366886 A1 Nov. 19, 2020

Related U.S. Application Data

(63) Continuation of application No. 16/700,765, filed on Dec. 2, 2019, now Pat. No. 10,687,051, which is a continuation of application No. 16/517,239, filed on Jul. 19, 2019, now Pat. No. 10,499,044.

(60) Provisional application No. 62/847,168, filed on May 13, 2019.

(51) Int. Cl.
H04N 13/366 (2018.01)
G06F 3/01 (2006.01)
G06T 19/00 (2011.01)

(52) U.S. Cl.
CPC ........... *H04N 13/366* (2018.05); *G06F 3/012* (2013.01); *G06T 19/006* (2013.01)

(58) Field of Classification Search
CPC ....... H04N 13/366; G06F 3/012; G06F 3/011; G06T 19/006; G02B 27/0093
USPC ................................................... 348/115, 53
See application file for complete search history.

(56) References Cited

U.S. PATENT DOCUMENTS

| | | | |
|---|---|---|---|
| 8,717,294 B2 | 5/2014 | Weising et al. | |
| 9,791,897 B2 | 10/2017 | Bear et al. | |
| 9,804,257 B2 | 10/2017 | Pusch et al. | |
| 9,839,840 B2 | 12/2017 | Long | |
| 2008/0191864 A1 | 8/2008 | Wolfson | |
| 2014/0118357 A1 | 5/2014 | Covington | |
| 2017/0287219 A1* | 10/2017 | Poulos | G02B 27/017 |
| 2017/0351094 A1 | 12/2017 | Poulos | |

FOREIGN PATENT DOCUMENTS

| | | |
|---|---|---|
| CN | 102939139 B | 3/2015 |
| CN | 105843396 B | 1/2019 |

(Continued)

*Primary Examiner* — Christopher S Kelley
*Assistant Examiner* — Kathleen M Walsh
(74) *Attorney, Agent, or Firm* — SoCal IP Law Group LLP; Steven C. Sereboff; Jonathan Pearce

(57) ABSTRACT

There is disclosed a system for viewing augmented, virtual, mixed, and combined reality environments. The system calculates the position and orientation of a movable display within physical space and translated those into an appropriate rendering of the content on the movable display also taking into account a head location for a viewer. The motion and location data for the movable display device and a viewer's head may be generated using trackers of various types.

20 Claims, 10 Drawing Sheets

(56) References Cited

FOREIGN PATENT DOCUMENTS

EP          2579128 B1    11/2017
KR       101955224 B1    3/2019

* cited by examiner

MOVABLE DISPLAY FOR VIEWING AND INTERACTING WITH COMPUTER GENERATED ENVIRONMENTS

RELATED APPLICATION INFORMATION

This patent claims priority and is a continuation from U.S. non-provisional patent application Ser. No. 16/700,765, filed Dec. 2, 2019 entitled MOVABLE DISPLAY FOR VIEWING AND INTERACTING WITH COMPUTER GENERATED ENVIRONMENTS, which is a continuation from U.S. non-provisional patent application Ser. No. 16/517,239, now U.S. Pat. No. 10,499,044, filed Jul. 19, 2019 and issued Dec. 3, 2019 entitled "MOVABLE DISPLAY FOR VIEWING AND INTERACTING WITH COMPUTER GENERATED ENVIRONMENTS", which claims priority from U.S. provisional patent application No. 62/847,168 entitled "DEVICE TO VIEW AND INTERACT WITH VIRTUAL, AUGMENTED, MIXED, AND CROSSED REALITY CONTENT WITHOUT A HEAD MOUNTED DISPLAY" filed May 13, 2019 all of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to a moveable display for viewing augmented, virtual, mixed, and extended reality environments.

Description of the Related Art

Virtual reality and augmented reality headsets or head mounted displays have periodically come into vogue and faded from the public eye. Most-recently, these types of displays have enabled various types of augmented and virtual reality experiences ranging from games to virtual "visits" to real places. Telepresence is increasingly becoming feasible on a relatively large scale as well.

However, one of the primary drawbacks to use of a head-mounted display (HMD) is that they typically completely cover the eyes of a wearer. This isolates the individual from any social interaction he or she may have while using the HMD. And, viewers or others nearby cannot necessarily see what is happening on the screen of the HMD without some external display and streaming of that content to that display. Unlike traditional television video games, this lessens the positive experience for all involved because the experiences typically become solitary ones. Multiplayer experiences are relatively limited at present for these types of experiences.

Figure 1:
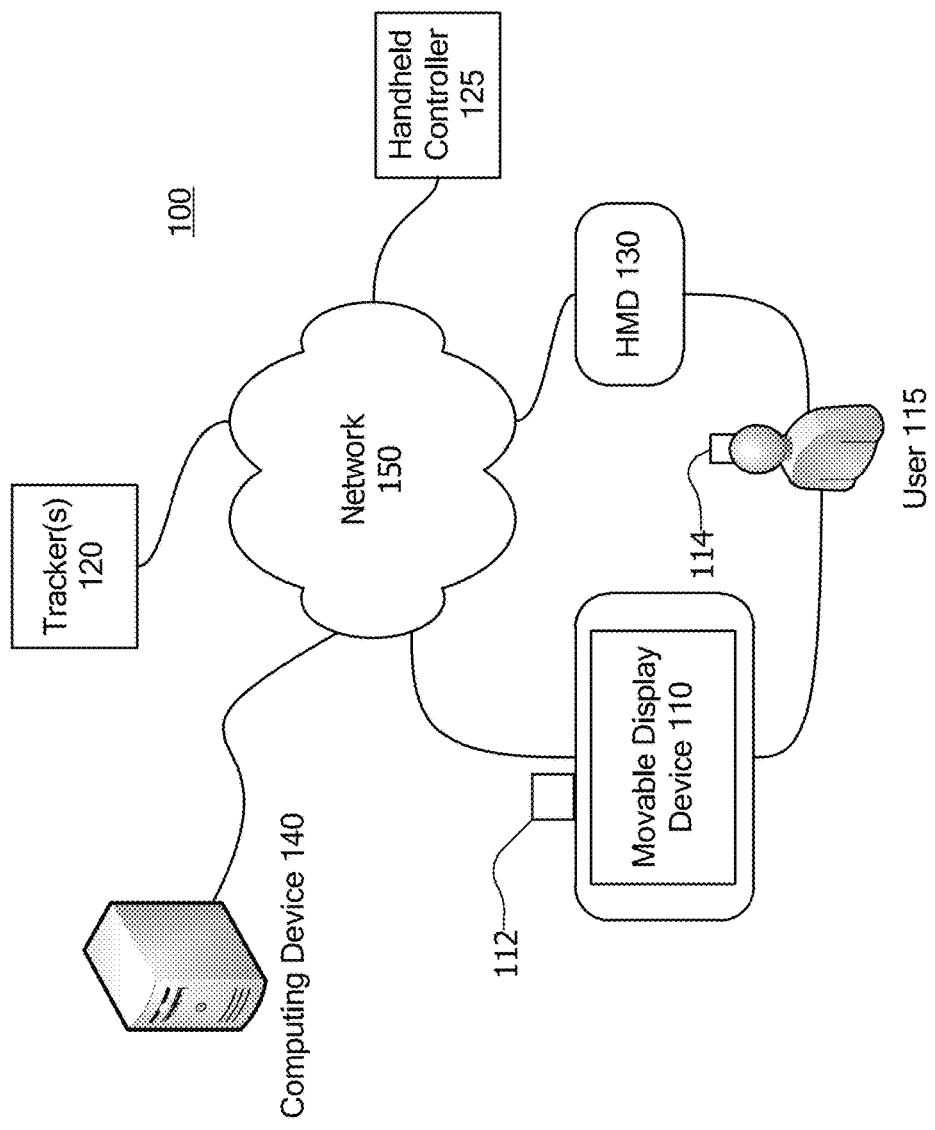
FIG. 1 is an overview of a system for viewing three-dimensional computer-generated content.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

The term "augmented reality" (or AR) means a live or near-live image of the physical world captured by a camera into which a computer-generated object or objects are superimposed so as to appear to be a part of the physical world when the live or near-live image and the object or objects are displayed on a screen. A display screen or other controls may cause the augmented reality to adjust as changes to the captured images of the physical world indicate updated perspectives of the physical world.

The term "mixed reality" (or MR) means a combined virtual objects and spaces and physical reality objects. It is closely related to augmented reality but may include, for example, a projection of an actual image of a person who is in a different physical location, using cameras to capture that person's image, then superimposing that person within a different physical environment using augmented reality.

The term "extended reality" (or XR) means a combination of physical location(s) and augmented realty objects with virtual reality objects within one computer-generated image. Virtual reality content may also be included.

The term "virtual reality" (or VR) means an entirely computer-generated, three-dimensional environment with capability of at least some control system by which a user may navigate or move within that environment. The control may be a handheld controller, one or more visual or other trackers, voice control, or some other control. The term "combined reality" or "crossed reality" means a combination of physical world and computer-generated, three-dimensional images in which a user may move and interact.

The term "computer-generated content" as used herein means at least one of "augmented reality," "virtual reality," "mixed reality," or "extended reality" content. "Computer-generated content" explicitly excludes solely two-dimensional content or traditional computer-generated two- and three-dimensional images on a fixed display such as a monitor, television, or projector.

The term "tracker" as used herein is a device or a system that tracks movement of a physical object in physical space. Tracker includes so-called "inside-out" trackers and so-called "outside-in" trackers as well as SLAM tracking, and tracking systems based upon colors, groupings of lights, or other camera-, infrared-, or LIDAR-based tracking. Other trackers, especially those that operate in free space, can rely in whole or in part upon electromagnetism or ultrasonic audio transmission and reception with calculations of the power and transmission time of those properties. Where a particular type of tracker is intended, it will be specifically named.

Description of Apparatus

Referring now to FIG. 1, an overview of a system 100 for viewing three-dimensional computer-generated content is shown. The system 100 includes a movable display device 110, used by a user 115, one or more tracker(s) 120, a handheld controller 125, a head mounted display (HMD) 130, and a computing device 140, all interconnected via a network 150.

The movable display device 110 is an independent computing device incorporating a display. The movable display device 110 may be a very basic computing device intended merely or primarily to act as a display screen for computer-generated content. Alternatively, the movable display device 110 may incorporate high-speed, and high-efficiency portable processors typically associated with mobile devices such as mobile phones and tablet computers. In the case of the former, the movable display device 110 may rely upon an external computing device, such as computing device 140, to generate computer-generated content for display. In the case of the latter, the movable display device may be effectively a stand-alone device, capable of calculating its own position within the physical world, and for rendering computer-generated content in response.

The moveable display device 110 may be a small form factor display device, such as a tablet personal computer or mobile phone. Alternatively, the movable display device 110 may be larger, such as a computer monitor or typical flat-screen television. In cases in which larger movable display devices are used, the movable display device may be mounted upon a movable arm. Such an arm may utilize one or more trackers in part to maintain a position of the movable display device 110 in front of a user's perspective. Whatever the size, the moveable display device 110 may or may not incorporate touchscreen capabilities.

The movable display device 110 may incorporate controls, buttons, or other systems whereby a user holding the movable display device 110 can interact with the device 110 or the computer-generated content shown on the associated display. Or, the movable display device 110 may connect to or otherwise operate in conjunction with a handheld controller, like handheld controller 125.

The movable display device 110 may incorporate front-facing or rear facing cameras or tracking systems whereby the movable display device 110 may detect an individual's head or a head-worn tracker to take the head location into account when generating or displaying computer-generated content on the movable display device 110.

The movable display device 110 includes tracker 112. Tracker 112 may be a single tracker or may be a series of trackers or tracker components. In a prototype prepared by the inventors, the tracker is a grouping of infrared lights in a known pattern designed to be easily detectable by external infrared camera(s). This is known as an outside-in tracker system. The particular grouping and arrangement of the infrared lights enable computer vision systems to process the arrangement of those lights and to ascertain the position and orientation of the tracker (and as a result, the movable display). Said another way, the system can utilize these infrared trackers to determine the pitch, roll, and yaw in a three-dimensional physical environment so that the movable display may be "tracked" within that environment and its movements may be translated into a virtual environment as discussed more fully below.

In other cases, the tracker 112 may be an inside-out tracking system that relies upon fixed tracker positions in the three-dimensional physical space and one or more cameras on the movable display itself for tracking the locations of those tracker positions relative to the movable display. Those tracker positions may be in whole or in part the tracker(s) 120 (discussed more fully below). In this way, the position of the movable display in three-dimensional physical space may be ascertained. Other systems are reliant upon a camera alone, along with computer vision algorithms, or upon projection of infrared or LIDAR point clouds within a physical space, then utilization of infrared or LIDAR cameras to track those point clouds to thereby determine the location, orientation, and rotation of the movable display. Whatever the case, the tracker 112 may be used.

Another tracker 114 may be worn or fixed relative to the user 115, for example, on the user 115's head. In this way, a translation between the position of the user's head and the movable display 110 may be calculated as a part of the process of updating the computer-generated content on the movable display 110. The tracker 114 may be independent of any head mounted display. The tracker 114 may be as simple as a headband or other passive tracker. In some cases, the tracker 114 may merely be a camera or depth sensor (or both) facing the user 155 head and tracking the user 115 head as it moves and rotates.

The tracker(s) 120 are the inverse or in addition to the tracker 112 and any trackers included in the other components such as the HMD or the tracker 114 worn by the user 115. The tracker(s) 120 may track each of the head mounted display 130, the movable display device 110 and the handheld controller 125. The tracker(s) 120 may be, for example, outside in trackers for tracking the various components in the system 100 as they move within the three-dimensional physical space.

The handheld controller 125 may be a traditional game controller incorporating a series of buttons, control sticks, triggers and/or bumpers. The handheld controller 125 may be specialized for a particular set of computer-generated content. So, for example, the handheld controller 125 may be shaped as a fishing rod for a fishing related experience or may be shaped like a light-saber for a Star Wars® themed experience. Other forms of the handheld controllers may be used. The handheld controller 125 may be only a controller, but it may also incorporate a tracker, as discussed above. The handheld controller 125 may then be used to track movement of an individual's hand (and potentially present it within the computer generated content) while holding the handheld controller 125, while the user is able to interact with the computer generated content using the other controls of the handheld controller 125.

The head mounted display (HMD) is optional and may be used only in certain cases, but if included, it is a head worn device incorporating a display, generally fully covering the eyes of the wearer, for the display of computer-generated content. The head mounted display 130 may be specially designed for this system 100 or a type that has recently become popular such as the Oculus® or Vive® head mounted displays. The head mounted display 130 typically incorporates one or more trackers as well. The head mounted display 130 could be used for augmented reality or virtual reality or both. A head mounted display 130 may be used to track the user 115's head in place of or in addition to the tracker 114. A head mounted display 130 is not necessary for the functioning of the system 100, but may be used in some cases.

The computing device 140 is a computing device (FIG. 2) that may be used in some cases to calculate appropriate perspectives and locations for the movable display device 110, the trackers 112, 114, and trackers 120, the handheld controller 125, and the head mounted display 130. In addition, the computing device 140 may generate the computer-generated content for display on the movable display device 110 using the calculated perspectives for each.

The computing device 140 may or may not be present in all situations. Specifically, the computing device 140 is shown as separate or stand-alone, but it may be integrated into the movable display device 110 in some or most cases. However, some particularly high-quality computer-generated content requires a very powerful computing device, for example, one including dedicated graphical processing capabilities designed for rendering in three-dimensions. In such cases, the computing device 140 may be separate from the movable display device 110.

The computing device 140 is shown as a single computer, but may in fact be many computers spread across numerous locations. The computing device 140 may be one or more virtual servers, operating in the midst of a larger, physical server.

The network 150 is a communications medium for interconnecting the various components of the system 100. The network 150 may be or include the internet, wireless or wired networks, local or wide-area networks, and/or telephone networks. The network's primary purpose is to enable communication between the various components of the system 100 to be shared so that augmented reality or virtual reality experiences or games may take place.

Figure 2:
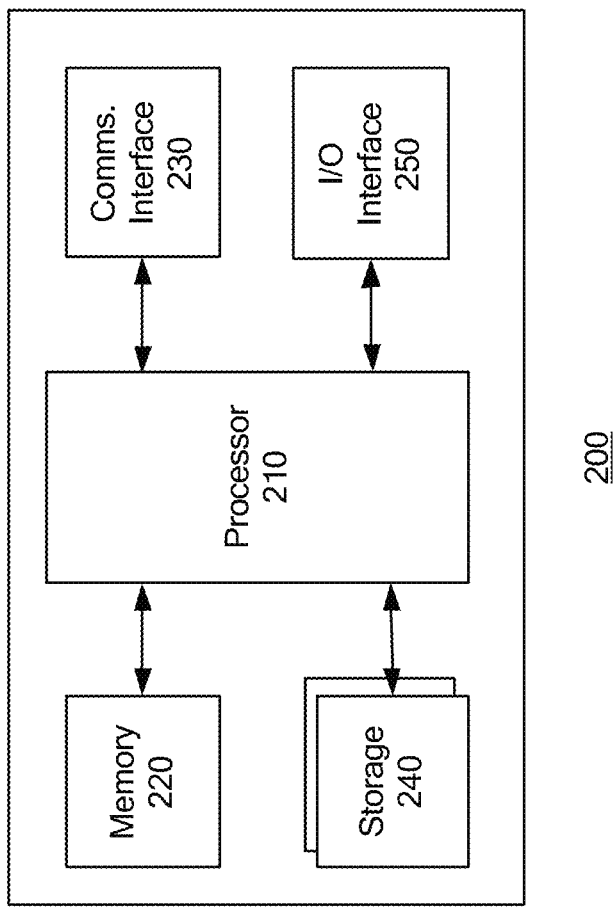
FIG. 2 is a block diagram of an exemplary computing device.

Turning now to FIG. 2, a block diagram of an exemplary computing device 200 is shown. The movable display device 110, tracker(s) 112, 114, and 120, handheld controller 125, and head mounted display 130 may be or include computing devices such as those shown in FIG. 2. The computing device 200 includes a processor 210, memory 220, a communications interface 230, along with storage 240, and an input/output interface 250. Some of these elements may or may not be present, depending on the implementation. Further, although these elements are shown independently of one another, each may, in some cases, be integrated into another.

The processor 210 may be or include one or more microprocessors, microcontrollers, digital signal processors, application specific integrated circuits (ASICs), or a systems-on-a-chip (SOCs). The memory 220 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 220 may store software programs and routines for execution by the processor. These stored software programs may include an operating system software. The operating system may include functions to support the communications interface 230, such as protocol stacks, coding/decoding, compression/decompression, and encryption/decryption. The stored software programs may include an application or "app" to cause the computing device to perform portions of the processes and functions described herein. The word "memory", as used herein, explicitly excludes propagating waveforms and transitory signals.

The communications interface 230 may include one or more wired interfaces (e.g. a universal serial bus (USB), high definition multimedia interface (HDMI)), one or more connectors for storage devices such as hard disk drives, flash drives, or proprietary storage solutions. The communications interface 230 may also include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, Wi-Fi®, ZigBee®, or some other public or proprietary wireless personal area network protocol. The cellular telephone network interface and/or the wireless LAN interface may be used to communicate with devices external to the computing device 200.

The communications interface 230 may include radio-frequency circuits, analog circuits, digital circuits, one or more antennas, and other hardware, firmware, and software necessary for communicating with external devices. The communications interface 230 may include one or more specialized processors to perform functions such as rendering, compression/decompression, and encryption/decryption as necessary for communicating with external devices using selected communications protocols. The communications interface 230 may rely on the processor 210 to perform some or all of these function in whole or in part.

Storage 240 may be or include non-volatile memory such as hard disk drives, flash memory devices designed for long-term storage, writable media, and proprietary storage media, such as media designed for long-term storage of data. The word "storage", as used herein, explicitly excludes propagating waveforms and transitory signals.

The input/output interface 250, may include a display and one or more input devices such as a touch screen, keypad, keyboard, stylus or other input devices.

Figure 3:
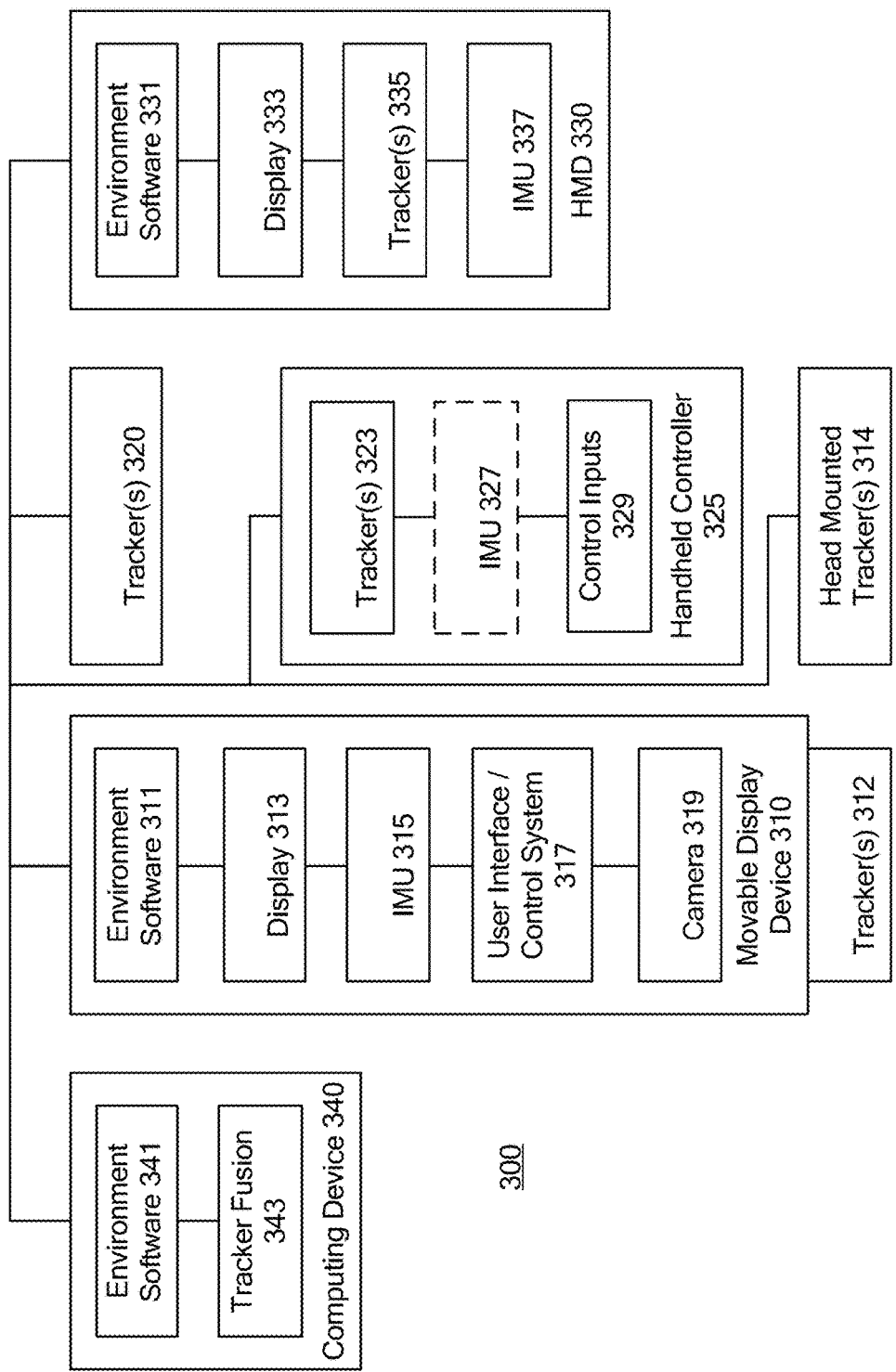
FIG. 3 is a functional block diagram of a system for viewing three-dimensional, computer-generated content.

FIG. 3 is a functional block diagram of a system 300 for viewing three-dimensional, computer-generated content. This has many of the same physical components as FIG. 1, but is focused on the various components of each device. The system 300 includes movable display device 310, including the tracker(s) 312, the head mounted trackers 314, the tracker(s) 320, the handheld controller 325, the head mounted display 330 and the computing device 340. Those components discussed with reference to FIG. 1 will not be described in detail again here. Each of the movable display device 310, head mounted tracker(s) 314, tracker(s) 320, handheld controller 325, head mounted display 330 and computing device 340 may be or include a computing device, as described with reference to FIG. 2.

The movable display device 310 includes environment software 311, a display 313, an IMU (inertial measurement unit) 315, a user interface/control system 317 and a camera 319.

The environment software 311 is software for rendering the three-dimensional, computer-generated content on the display 313 of the movable display device 310. The environment software 311 may be a modified version of a so-called "game engine" software that is designed and optimized for rendering computer-generated content. Some of the modifications made, as discussed herein, are to the capabilities of the environment software to select a perspective for the content based not upon input from a controller or keyboard, but based upon a position in physical space of one or more trackers, such as the head mounted tracker(s) 314. In this way, the environment software 311 can alter the appearance of the computer-generated content on the display 313 based upon a relative position between two physical objects (e.g. the head mounted tracker(s) 314 and the movable display device 310), as opposed to mere use of the movable display device 310 as a "window" into an already existing three-dimensional world with the device as the only point of reference.

The display 313 is for displaying computer-generated content to a user or viewer. The display may be LCD, backed by CFL or LED lighting or may be an integrated OLED display or other type of display. The Display 313 may incorporate touch-screen capabilities, either resistive or capacitive or optical, which enable a user to interact with the display 313. The display 313 may be capable of passive or active three-dimensional or stereographic display. In passive systems, a three-dimensional effect may be achieved using lenticular techniques or using polarized or colored glasses. In active systems, shutter displays (one video frame for a left eye, the next frame for the right eye) where battery powered glasses or similar structures are synchronized to the shutters to ensure that each eye is presented only with a video frame intended for that eye are traditionally used to differentiate between two different perspectives presented by the display 313. As will be discussed more fully below, the presentation of two distinct perspectives for each of a given user's eyes may present a more fully-realized three-dimensional environment for the computer-generated content.

The IMU 315 is an integrated sensor group that is specifically designed to track movement of a computing device within physical space. The IMU 315 may have an interface which periodically or upon request outputs the IMU's calculated position change relative to a baseline time. This information may be used, alone to generate movement data (e.g. rotation and velocity) or in conjunction with other sensors (e.g. camera 319 or tracker(s) 320) to generate a position and orientation for the movable display device 310. The IMU 315 may include one or more accelerometers, a magnetic compass, one or more gravitometers, and may include a clock. Other sensors may be included as well.

The user interface/control system 317 may be fully or partially hardware and software. In some cases, the user interface/control system 317 may include one or more buttons, switches, control sticks, dials, or knobs on the exterior of the movable display device 310. In other cases, the user interface/control system 317 may be entirely software, with a user interacting through software-based interactions with the display 313 (e.g., a touchscreen display) or through an external controller (e.g., the handheld controller 325). The user interface/control system 317 enables a user to interact with the movable display device 310. Those interactions may be selecting elements within a menu system, launching or quitting the environment software 311, or interacting with the environment software 311 (e.g., firing a gun, opening a door, initiating a video call, or talking with another player or computer-controlled character).

Camera 319 may or may not be present in all cases. The camera 319 may be front-facing (i.e., facing the user) or rear-facing (i.e., facing away from the user) and may be one or more cameras (e.g., a camera array). The camera 319 may be used to track the location, position, and orientation of the movable display device 310 in physical space or to track a user (e.g., facial tracking) or both. The camera 319 may be an RGB video camera. The camera 319 may be or include infrared arrays and an infrared camera for creating depth of field arrays and tracking them to aid in tracking the movable display device 310 in physical space.

The tracker(s) 312 may be mounted to the exterior of or integrated with the movable display device 310. The tracker(s) 312 may be active or passive and may be assisted by additional external trackers or cameras. The integration of the tracker(s) 312 with the movable display device 310 simplifies the software for tracking them in physical space. For example, if a series of infrared lights are used as a passive tracker on the exterior of the movable display device 312 and they are tracked by external trackers (e.g., tracker(s) 320), then software-based upon an expected configuration of those infrared lights makes tracking them a more constrained problem than merely tracking a human form, for example, in free space.

The head mounted trackers 314 and the tracker(s) 320 are discussed above. That discussion will not be repeated here.

The handheld controller 325 includes tracker(s) 323 and control inputs 329. It may include an IMU 327 as well. The tracker(s) 323 are used, much like the tracker(s) 312 on the movable display device 310, to track the physical location in three-dimensions of physical space for the handheld controller. In this way, for example, as a user holds both the movable display device 310 and the handheld controller 325, the environment software 311 can integrate the physical locations of both to generate computer-generated content incorporating both (e.g., using the movable display as a "window" into the computer-generated content, and simultaneously integrating the handheld controller 325 into that computer-generated content). So, swinging a virtual tennis racket via the handheld controller 325 within the computer-generated content may be integrated and reflected in the same virtual location, relative to the physical location, within the computer-generated content.

The tracking may be completely based upon the tracker(s) 323. However, the integration of data from tracker(s) 323 and an IMU 327 has been shown to generally be more accurate than either working alone. The IMU 327 operates in much the same way as the IMU 325.

Control inputs 329 may be buttons, sticks, dials, knobs, and other control inputs that enable a user using the handheld controller 325 to interact with the handheld controller 325 and, thus, with the environment software 311. This interaction may be selecting from menus, firing a weapon, swinging a tennis racket, or virtually any other interactions.

The head mounted display 330 includes environment software 331, a display 333, tracker(s) 335, and an IMU 337. The environment software 331 has substantially the same function as that described with respect to environment software 311. The display 333 is likewise similar in function to that of display 313, and the tracker(s) 335 serve a similar function to tracker(s) 312. And, finally, the IMU 337 serves a similar purpose for the head mounted display 330 as the IMU 315 does for the movable display device 310.

However, the head mounted display 330 is designed to be worn on a user's head. In cases where the user is wearing a head mounted display 330, the head mounted tracker(s) 314 may not be necessary, or may, in some cases, be worn by someone other than the individual wearing the head mounted display. In a single-player experience, for example, a user may wear the head mounted display 330 (in place of the head mounted tracker(s) 314) and use the handheld controller 325 to interact with the experience while a second user (or group of users) watches the experience from a third perspective using the movable display device 310. In such an example, one of the group of users may instead wear the head mounted tracker(s) 314 to calculate an appropriate perspective for that user without interrupting the experience for the single player. In other cases, the HMD 330 may incorporate augmented reality capabilities, such as a pass-through image using a camera (not shown) on the head mounted display 330 and in such a case, the tracker(s) 335 of the head mounted display 330 may take the place of the head mounted tracker(s) 314. In a more typical example, a user can use the moveable display device 310 while wearing tracker(s) 314 to track that user's perspective. Another could optionally wear an HMD 330 to view the same computer-generated content being experienced by the user but from a different perspective.

The computing device 340 includes environment software 341 and a tracker fusion 343 system. The environment software 341 here may be better-suited to actually generating the computer-generated content. The computing device 340 may be a personal computer incorporating one or more specialized graphical processing cards or components. In such a case, the environment software 341 may operate as a server to perform rendering of the computer-generated content that is merely transferred for display on the movable display device 310 or the head mounted display 330 or both. In other cases, the use of a separate computing device 340 may be completely unnecessary or may be integrated within the movable display device 310 or the head mounted display 330 or both.

The tracker fusion 343 receives various tracker data from each of the tracker(s) 312, 314, 320, and 335 and integrates that data into a form suitable for use by the environment software 341 to generate relevant perspectives of the computer-generated content for each of the associated devices. That may include rendering the computer-generated content from the perspective of both the movable display device 310 (taking into account a user's head position detected by the head mounted tracker(s) 314) and the head mounted display 330 which may be worn by another individual. The handheld controller 325 may be represented in the computer-generated content at a location relative to both the movable display device 310 and the head mounted display 330. All of this data is integrated by tracker fusion 343 and provided to the environment software 341 for rendering. As with the environment software 341, the tacker fusion 343 may operate more efficiently on specialized hardware, but tracker fusion software may be integrated into the movable display device 310 or into the head mounted display 330, or both.

Description of Processes

Figure 4:
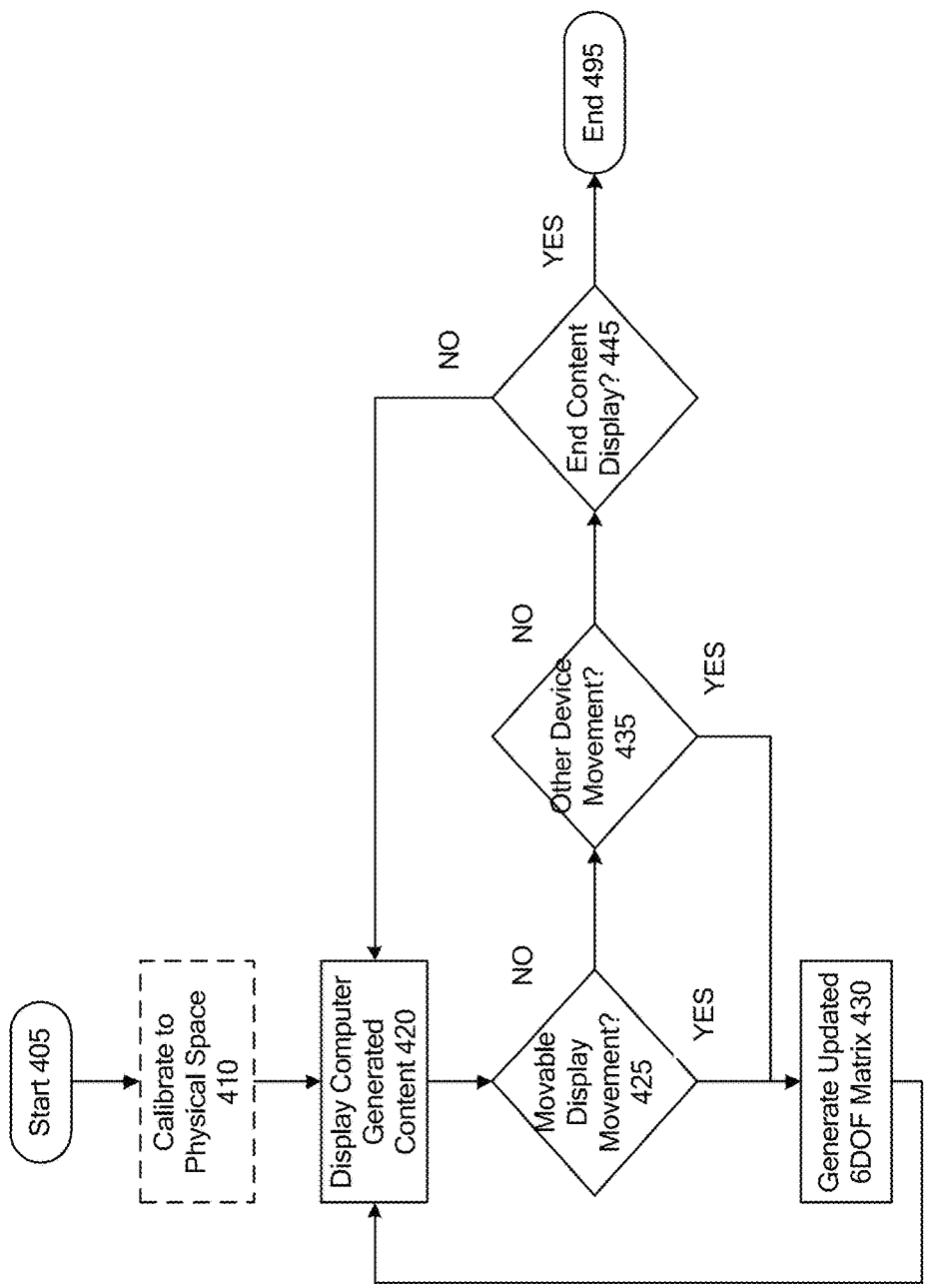
FIG. 4 is a flowchart of a process for generating and viewing three-dimensional, computer-generated content.

FIG. 4 is a flowchart of a process for generating and viewing three-dimensional, computer-generated content. The process begins after start 405 and continues to the end 495. The process can continue until it is terminated or until there are no further updates to the movement of the movable display unit.

First, following the start 405, the system may calibrate to the physical space 410. This may not be present in all cases because the system may have previously been calibrated to the space. Or, the system may incorporate self-calibration capabilities (e.g. infrared sensors that detect walls and floors at initialization and thereby set a starting point as an origin (0, 0, 0) in a physical (x, y, z) coordinate space.

When present, calibration at 410 is designed to set a baseline for the various components (e.g., the head mounted display, the movable display device, the handheld controller, and the various trackers; see FIGS. 1 and 3). On-screen prompts may indicate how or wear a user is to place or wear the various components to perform the calibration. One typical example would be to wear the head mounted tracker(s) 312 and hold the movable display device 310 at approximately waist height then touch the screen of the movable display device 310 to set a baseline for a user's relative height, and the location and orientation that are most natural for the user. Various trackers may set the detected locations, orientations, and rotations (e.g., pitch, roll, yaw) for each component using this calibration phase. Or, a projection of infrared or LIDAR beams may be ejected from the movable display device or other trackers and may be used to detect various component's physical location within physical space.

Following calibration, the computer-generated content may be displayed at 420. This involves the operation of the movable display or computing device to generate computer-generated content on the display. At this stage, the initial state of the computer-generated content is shown on the movable display. It may also be shown on any head mounted display being used and, potentially, upon an external display if one is available (e.g., a television screen). The initial perspectives for the user's head relative to the movable display device are calculated and those are used to generate an image of the computer-generated content that is accurate for the associated perspective of that head relative to the movable display. This initial computer-generated content may be a baseline set of content designed for the initialization phase and may follow any introduction video or interactions.

Next, the tracker(s) 312, 314, and 320 (FIG. 3) are used to detect movement of the movable display device at 425. This movement is detected using one or more of the tracker(s) 312, 314, and 320 and/or any integrated IMU in any of the devices. The operation can take many forms, but most commonly, outside-in tracker(s) 320 include infrared cameras that track the movement of one or more infrared lights visible to those cameras on the movable display. Following calibration, the position is merely a translation of that movable display to another location. Those tracker(s) 320 output the translation as a relative position to either an origin point (e.g., (0, 0, 0) in (x, y, z) coordinate space) or to an initial point for that movable display in the physical space. The IMU may provide additional or, sometimes, the only indication of rotation and upward and downward or forward and backward motion for the movable display, typically as an estimation of the movement or rotation speed and the total movement or rotation distance.

If there is movement of the movable display device ("yes" at 425), then a new six degree of freedom matrices are generated at 430. This is discussed more fully below with reference to FIG. 5, but in short, the relative location information for each of the tracked devices (movable display device 310, head mounted display 330, handheld controller 325, etc.) may be represented by a six degree of freedom matrix. Then, the environment software 341 may incorporate those matrices into the associated computer-generated content at their respective locations and with their respective orientations and rotations. All of that data may be relative to an agreed-upon (0, 0, 0) location (in an (x, y, z) axis) integrating movement in the physical world with corresponding movement in the virtual world. Similarly, rotations about any axis (represented through quaternions) may also be included in such a matrix. Ongoing movement may be represented as a vector.

Next, the computer-generated content may be generated and displayed at 420 using the newly-updated six degrees of freedom matrix generated at 430. This may reflect the new location and orientation of the movable display device. Rotation in space can include a relative orientation (e.g. relative to a tracker or a fixed initial orientation) or an absolution rotation (e.g. fixed relative to another object or location). That is, the physical movement of the movable display device may be translated into the virtual environment of the computer-generated content. For the movable display device this means, at a minimum, that a perspective on the associated computer-generated content will have changed.

For example, a user first looks through the movable display straight ahead at a virtual environment. Then, the user moves the movable display 90 degrees to his or her left, then the computer-generated content shown on the display may be updated to show that movement in the virtual environment since the user's perspective relative to an origin point, and his or her head (using the head mounted tracker(s) 314) has changed. A translation factor may be incorporated such that a 90 degree turn in the real world may be a 180 degree turn in the virtual world (or 45 degrees). Likewise, a translation factor may cause movement within the physical world of only a foot or so to translate into tens or hundreds of feet in the physical world.

If there is no movement of the movable display device ("no" at 425), then the process proceeds to determine if there has been movement of any other device at 435. This is the movement of the head mounted tracker(s) 314, the head mounted display 330 or the handheld controller 325. If so ("yes" at 435), then updated six degrees of freedom matrix is calculated at 430 and the computer-generated content is updated and displayed at 420.

If there is no change ("no" at 435), then a determination is made whether the process of displaying content should end either by user action or user inaction or by a lack of movement of any device at all (e.g., a timeout) at 445. If not ("no" at 445), then the computer-generated content continues being displayed without change at 420. If so ("yes" at 445), then the process ends. In this way, the process can continue updating the movable display device and any other displays based upon movement of any device until the process should terminate at the end 495.

Figure 5:
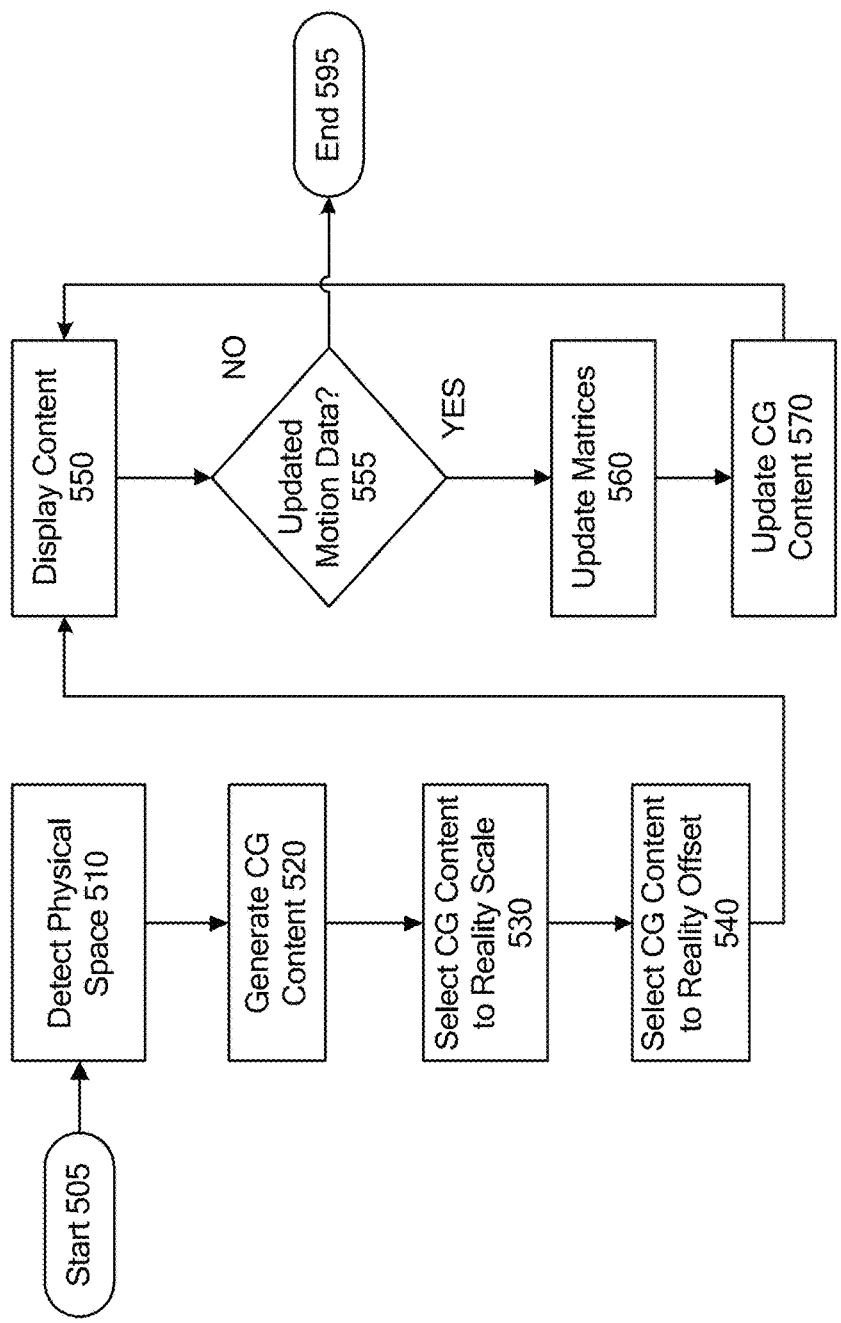
FIG. 5 is a flowchart of a process of calculating positional matrices for generating three-dimensional computer-generated content.

FIG. 5 is a flowchart of a process of calculating positional matrices for generating three-dimensional computer-generated content. The process follows the start at 505 and continues to the end 595.

The process begins with detection of the physical space at 510. The physical space may be detected in several ways. One is calibration as described above with reference to FIG. 4. In addition, in that example, a user may input the distance or the tracker(s) 320 may assist a user in detecting and noting, the distance between them. Using stereography and geometry, the distance from two tracker(s) 320 may be used to derive the distance from the trackers to an object such as a wall or the movable display. Similarly, an infrared array may create a point cloud and use the distortions of that point cloud detected by an infrared camera to detect the parameters of the physical location. Other methods such as using a LIDAR rig also exist.

This step orientates the movable display (and any other physical devices) to the computer-generated content. At this stage, the baselines for each component are set. In some cases, an offset may be set for the user's eyes (or eye) relative to a head mounted tracker 314 at this stage. The detection may take several clock cycles to generate an average of the physical location of each device. This helps to account for jitter and erroneous samples. The devices are all detected and set, in variables, to a location relative to an origin (e.g. (0, 0, 0) in (x, y, z) coordinates). The system may instruct the user through on-screen prompts how to orient the movable display device, or other devices at this stage.

At this stage, individual virtual "trackers" may be set up that are virtualized versions of the physical devices. These are intentional software simplifications that may be represented in the computer-generated content, but that enable a simplified reference to a device merely by its coordinates in space along with any orientation or rotation data. For ease of translation to the virtual space, these software constructs may have a single "point" in space (e.g., a center point) and an orientation represented by a single vector. In this way, they are easier to represent in the virtual world and the associated data is relatively small should it need to be communicated amongst the various components. All of this detection may rely upon the various trackers available to the system within the physical space.

Following detection of the physical space, the three-dimensional, computer generated content is created at 520. Here, the computer-generated content is created, for example, using a modified video game engine. Textures are applied to models and three-dimensional objects are represented on the display as directed by the associated software. Augmented reality content may be superimposed over actual images of the physical world.

This may be only a single three-dimensional object set in a physical space in an augmented reality environment made up of primarily a video representation of reality. Or, in some cases, the environment may be entirely computer generated. This is selected by a user by, for example, launching an application or particular environment software for the computer-generated content.

Next, the user or the software sets a scale of detected movements and sizes in physical space to computer-generated content at 530. This may be user-selected scale (e.g. 1:1 scale to correspond to real objects) or may be set by a designer of the computer-generated content. Alternatively, this may be set based upon the size of the physical space detected in 510 so that the content corresponds with that physical space. When scaling takes place, the models and textures of the computer-generated content are dynamically resized to correspond to a selected scale. At this stage, the content may be scaled, for example, to appropriately fit within a given physical space in the case of augmented reality content or scaled to enable a user to experience fully virtual reality content from an appropriate perspective (e.g., a home is an appropriate size to walk through the front door, movements are translated at an appropriate rate to not feel unusually sluggish or fast, etc.).

Next, any offset of the computer-generated content is set at 540. This may be done automatically by the software or partially or fully by a user. These offsets may be for components such as a physical offset from the head mounted tracker (which may be several inches from the actual eyes of a viewer of the movable display device) from the user's eyes. Similarly, the display position should be centered in the movable display device. A user may hold a handheld controller in the center of his or her waist but a particular computer-generated content (e.g., tennis match) may cause a user to expect a controller to be to a user's virtual "right" held in one hand. These and other offsets set baselines for the movable display device, head mounted tracker(s), the handheld controller, and the head mounted display. These offsets may be seen throughout the computer-generated content that is to come.

All of the baseline data including the physical space, the scale, and any offsets are stored in matrix form (quaternions may be used for calculations), then used to display the computer-generated content at 550. The content may be initially displayed in an initialized state. Even in the first state, the perspective matrix for the content is calculated, at least, taking into account the position of the head worn tracker(s) and the movable display device in physical space. This is so that the perspective shown on the movable display device is accurate to the user holding the display. In this way, a user may be presented with a perspective that corresponds to movement of the movable display and to movement of his or her head.

To do this, the constructs for the user's head and the movable display may be used. The trackers may generate data corresponding to a location and an associated direction (e.g., which way is each of the display and the head facing). Those two components may be merged to generate an appropriate perspective matrix. Even the distance between the movable display device and the head mounted tracker(s) may be detected in physical space and recreated in virtual space. That may be translated directly (e.g., 1.5 feet in the physical world is 1.5 feet in the virtual world) or using a scaling factor set at 530 to some larger or smaller distance. Similarly, any offsets (e.g., for the user's eyes) may be taken into account. A perspective matrix may then be generated using all of the information for the movable display relative to the user's head.

The eyes offsets may be a single value, such as the "center" between the eyes being three inches lower than the head mounted tracker(s). Alternatively, the eyes offsets may be independently calculated or set. In this case, the location of each eye may be calibrated and used (e.g. three inches down, and 1.5 inches to the right and left) for two locations. The two offset calibration may be most helpful in the case of stereoscopic displays. There, an independent perspective matrix may be calculated for each eye individually. Then, two perspectives may be generated and (discussed below) two final render perspectives may be created, one for each eye. Then, those two independent perspectives may be used to render the computer-generated content appropriately for each eye. As needed, appropriate display and viewers (e.g. polarized glasses) may be used.

The offsets for multiple eyes may be interpupillary distance (centered on the head mounted trackers) offset by a certain distance down (e.g. 3 inches). Alternatively, each may be input into software or estimated by a user. Alternatively, the eye offsets may be detected by external cameras using pupil tracking or stereoscopic cameras using pupil tracking.

Since the display is movable, it may be easily handed from one individual to another. In cases in which pupil tracking is used or in which a head mounted tracker is removed (e.g. detected by a depression of a button on the tracker that is depressed when worn) from one user's head and the put on another, the offsets and associated perspective may automatically update to appropriately account for the new user. In this way, the system may automatically and quickly orient itself to a new user of the handheld display if such a removal and replacement is detected or if new, closer together or further apart eyes are detected.

Notably, in the situation in which two offsets are used (one for each eye), the location and orientation of each eye may be calculated for that perspective. One can imagine a situation in which the eyes are always expected to be at the same location on a y-axis. This may simplify the mathematics, but in a situation in which a user tilts his or her head at an angle, this results in a substantial break in the reality of the experience. So, if the full three-dimensional location of each eye is constantly being tracked and updated, relative to a position and orientation of the head mounted tracker(s), then the perspective matrix may be appropriately calculated for each eye independently as well, even if those eyes are at different heights, depths, or rotations.

Next, a camera matrix may be calculated. This matrix is the representation of the movable display (or any display, such as the head mounted display or some other perspective) on the computer-generated content. As the movable display device is moved in the physical space, its perspective on the computer-generated world changes. So, this is a second perspective calculated for the overall matrix. This matrix is a translation of the physical orientation of the movable display device (detected by the various trackers) to the virtual world.

To calculate the camera matrix, the location of the user's eye (or eye's in the case of stereography), which is calculated based upon the offset(s) found at 540, is obtained and the position of the movable display in space is obtained. Any rotation of either is also determined using the tracker(s) 320. The camera matrix is designed such that the user's eye is the "center" of the camera. In a typical video game context, the center of the display (e.g. a monitor) is the camera location within the game world. Here, the camera is actually projected back somewhat from the display with the movable display acting only as a "window" into that world. So, the camera matrix defines the location and rotation as a matrix with that eye location in mind.

Once both the perspective matrix (or matrices) and the camera matrix are known, the final render perspective may be calculated by multiplying the two matrices together to arrive at a combined render matrix. This final render matrix (or matrices for stereography) will be appropriately rendered for both the position of the movable display device in physical space (relative to virtual space) and the user's head as detected using the head mounted tracker(s).

Other devices may also be represented (e.g., the handheld controller or a head mounted display) within the virtual environment in their respective positions. In some systems, cameras may track individuals or body parts (e.g., a hand) and represent those in the computer-generated content as well. In the case of the final render matrices for stereographic display, once objects or other devices are tracked in the virtual space, those objects are automatically represented appropriately in the one or two final render matrices. Specifically, the matrices remain the same for the camera matrix, so incorporating any objects into that camera matrix that are visible from that perspective automatically include an appropriate perspective for those objects as well. So, when the final render matrices are created, the objects are likewise represented as well.

Other offsets may be set, for example, an offset for a user's ears or for both of a user's left and right ears so that a user wearing headphones while interacting in the space or listening on speakers in room may be presented with appropriate spatial sound based upon their physical position in a space relative to a virtual space or based upon the position of the movable display device within the virtual space. In a typical case, a single point, directly between a user's ears is estimated. This may be based upon the eye offsets or set independently based upon a head mounted tracker.

Using these offsets, for example, if a user puts the movable display device very close to a gunshot but immediately to the left of that gun as it fires, then the sound may come primarily out of the right side speaker. If the user faces the movable display device exactly the opposite direction, next to the same gunshot, it may sound as though it is coming from that user's left. This may be calculated in much the same way that the position for a user's hand or the movable display device itself may be calculated.

Similarly, spatialized haptics may be included. For example, if a user's hand is represented through a controller or tracker that incorporates haptics, then movement of that hand or controller may be tracked in free space using the same tracker(s) that track the head mounted tracker(s) and the moveable display. As a user's "hand" (represented by that controller or haptic device (e.g. a haptic glove)) moves closer to a virtual speaker or to a firing gun, haptics may increase to provide an immersive feel for that hand being near to the associated sound or physical vibration that would be present were it a physical world representation. The haptics may be localized to a place within the virtual space in much the way sound is spatialized as described above.

After the display of content, then a determination is made whether motion data has been updated for any of the devices (e.g., movable display device, head mounted tracker(s), handheld controller, head mounted display) at 555. This may use the tracker(s) 312, 314, or 320 and/or any of the IMUs. If a change in position of any of the devices is detected, that is motion. If there is no movement at all ("no" at 555), then the process may end at 595.

However, if movement is detected ("yes" at 555), then the matrices that make up the positional information for the movable display device and each other device may be updated at 560. Any movement of any device should be reflected in the computer-generated content, but movement of the movable display or relative movement of the head mounted tracker(s) will cause an update to be necessary to the perspective matrix and/or camera matrix which will alter the render matrix. The associated matrices are recalculated at 560. Then, the computer-generated content is updated such that the virtual objects in the computer-generated content correspond to those changes at 570 and is displayed at 550.

Figure 6:
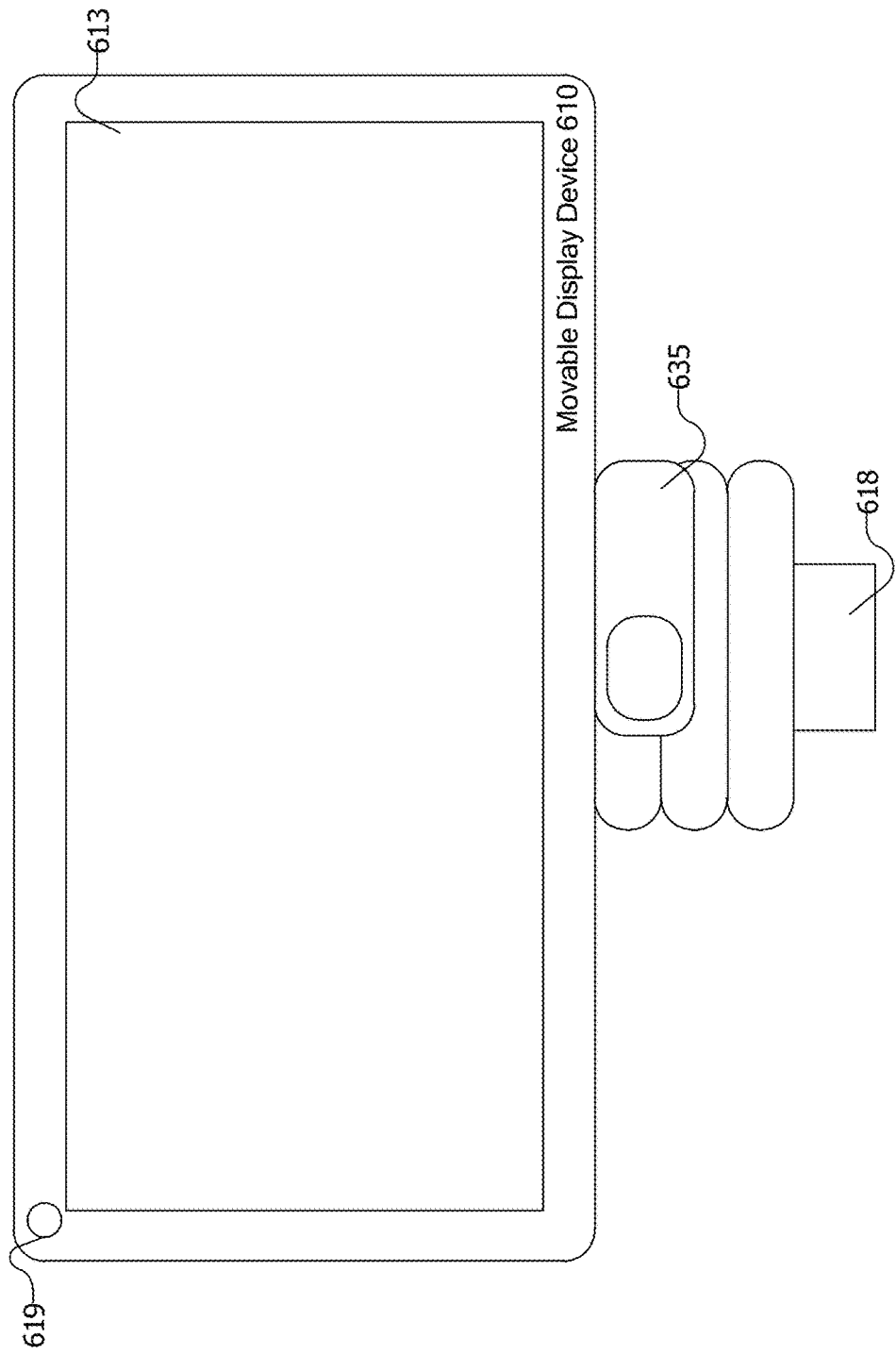
FIG. 6 is a movable display device seen from the front.

FIG. 6 is a movable display device 610 seen from the front. The movable display device 610 includes a display 613. A camera 619 may also be included. The camera 619 may be infrared, RGB, or an array of cameras. The movable display device 610 is handheld, so a user's hand 635 is seen holding the movable display device 610 by a handle 618. However, a handle 618 is not required. In some cases, it may be unnecessary, in other cases, it may be extremely helpful. In still other cases, the movable display device 610 may be mounted upon a movable or robotic arm to move at the direction of a computing device, for example, to maintain the movable display in a specific location relative to a user's gaze.

Figure 7:
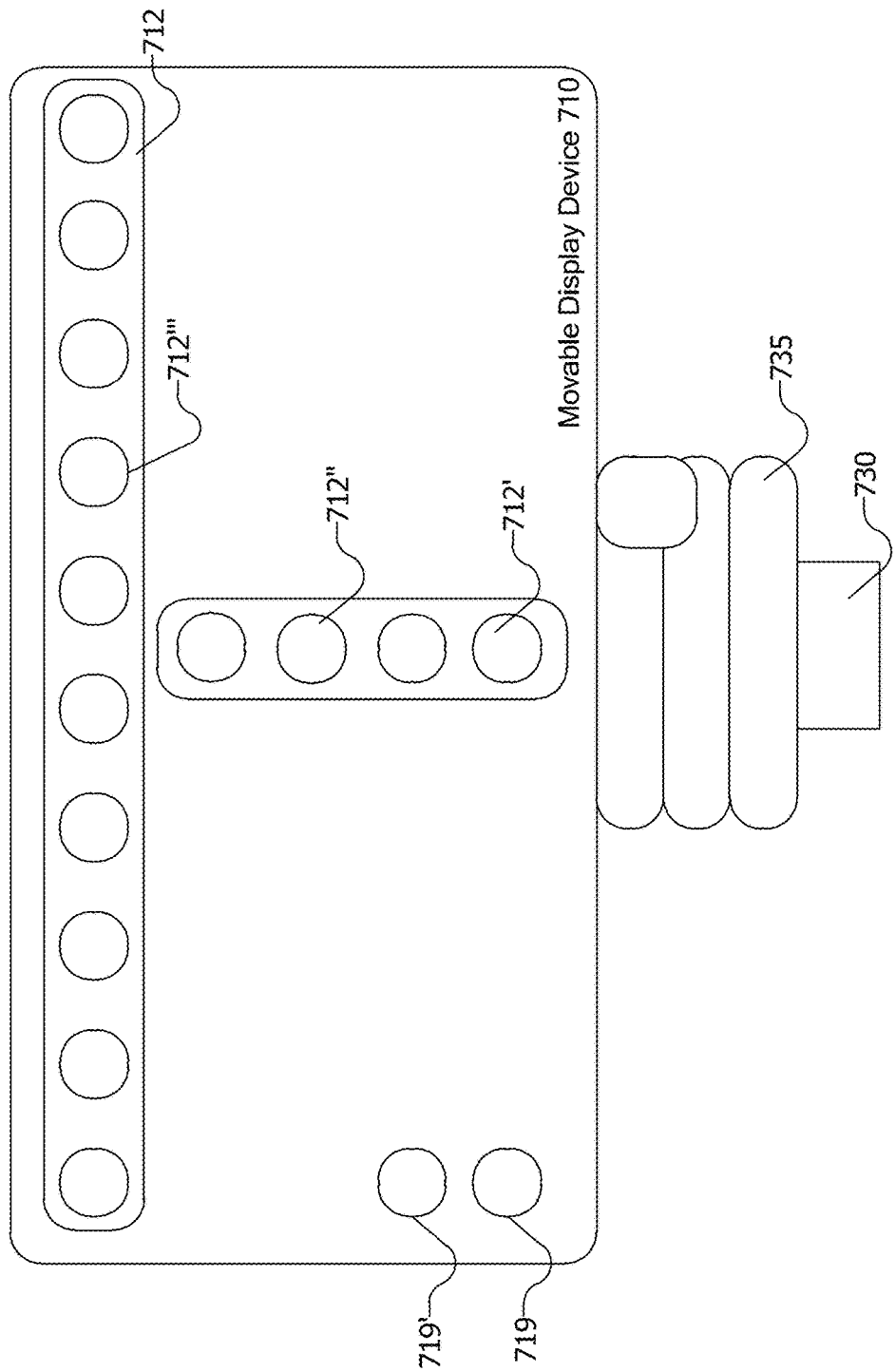
FIG. 7 is a movable display device seen from the back.

FIG. 7 is a movable display device 710 (which is the same as movable display device 610) seen from the back. The movable display device 710 may be tracked primarily from its back (e.g. using external trackers). Though, other trackers may be on both sides of the movable display device 710, several are shown on the back for purposes of illustration. Here, the tracker(s) 712 include an array of trackers 712', 712", 712''' and others (not labelled). The tracker(s) 712 are infrared lights which might not be visible to an unaided human eye. But other tracker systems are possible, as discussed above. The tracker(s) 712 are shown in a "T" pattern which is an example of a pattern relatively easily recognizable to external infrared cameras which may be used to perform tracking.

The movable display device 710 may also incorporate camera(s) 719 and 719'. These are shown as two cameras 719 and 719' to indicate that the camera(s) 719 and 719' may be a camera array and which operate together. Multiple cameras are better for performing visual tracking. And, these cameras 719 and 719' may be used alone or in conjunction with tracker(s) 712 to perform tracking of the movable display device.

The movable display device 710 is shown with a hand 735 holding it using a handle 730.

Figure 8:
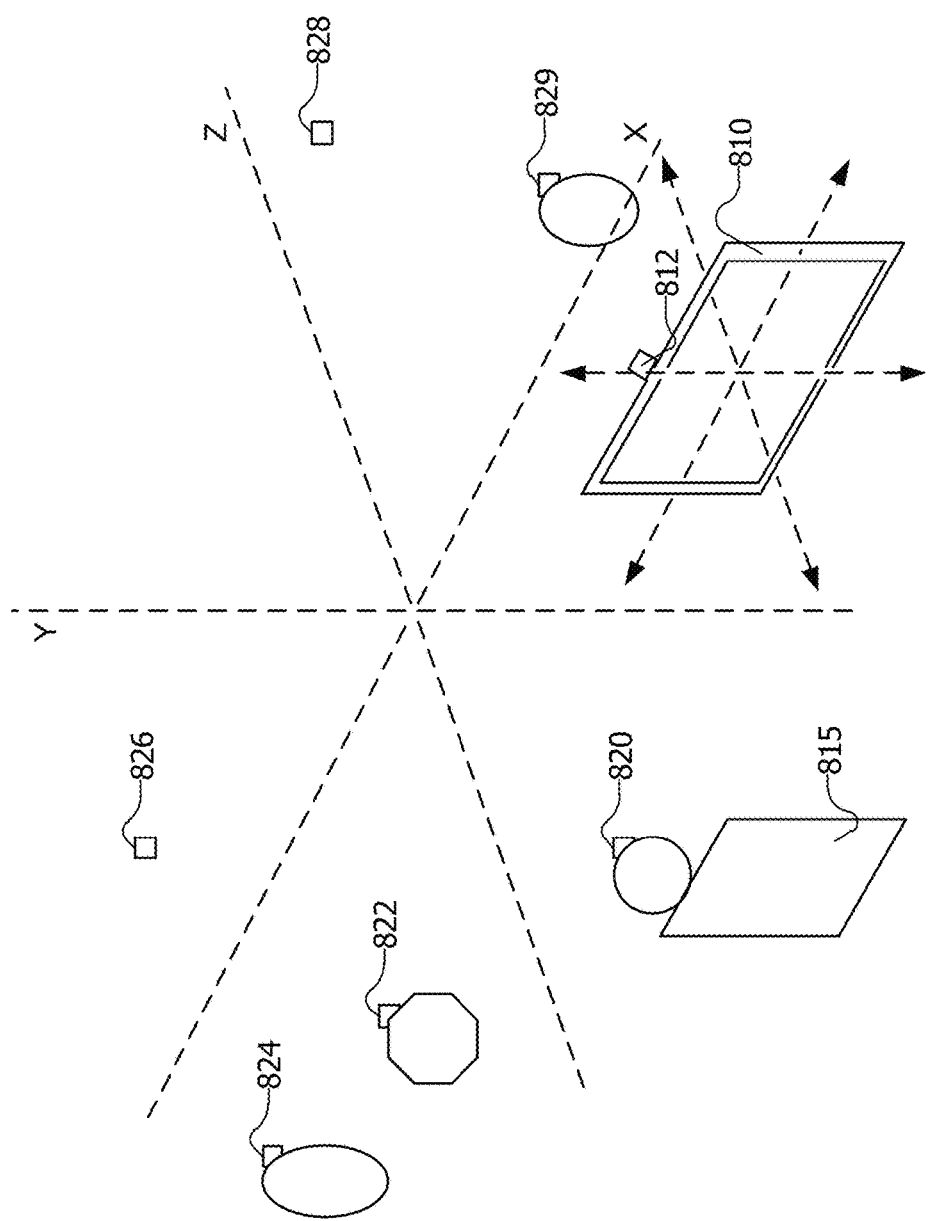
FIG. 8 is an exemplary six degrees of freedom physical location including a movable display device, a user, and various other objects.

FIG. 8 is an exemplary six degrees of freedom physical location including a movable display device 810, a user 815, and various other objects. Here the movable display device 810 incorporates a tracker 812 that may be tracked in physical space by trackers 826 and 828. These trackers 826 and 828 may be infrared cameras which track the "T" shape on the back of the movable display 810.

Simultaneously, the user 815 is wearing a head mounted tracker 820 which may also be tracked by the trackers 826 and 828. As discussed with reference to FIG. 5, the perspective of the user relative to the movable display and the movable display relative to a virtual world may be calculated using this tracking information.

In some cases, the head mounted tracker 820 may track infrared markers on the face of the movable display 810 or the movable display 810 may incorporate front-facing cameras (infrared or otherwise) to track the head mounted tracker 820. In this way, localized, short-range tracking techniques, which may be more accurate than some room-scale tracking techniques, may be used to track some or all of the systems herein, while the counterpart, e.g. the head mounted tracker 820 may be tracked in open space by a separate tracker. In this way, the system may incorporate multiple tracking techniques to duplicate tracking capabilities or augment them or to provide two bases for confirmation of location and orientation data for some or all of the devices being tracked.

Other objects may likewise have trackers 822 and 824. Or, in some cases, no trackers may be used at all and visual cameras or infrared cameras and lighting arrays in trackers 826 and 828 may track objects in three-dimensional physical space (e.g., a user's hand or other object).

These objects may also be tracked behind the moveable display 810. For example, tracker 829 is affixed to an object that has moved behind the moveable display 810. In such a case, the object may be represented (either actually or virtually) within the display 810. This means, for example, that if a user's hand is passed behind the moveable display 810, then that hand may be represented within the display. Alternatively, an augmented reality or virtual object may be presented on the display 810 in place of the user's hand (or other object, like a handheld controller). As discussed above, because the objects are tracked in three-dimensional space, and because the perspective and camera matrices are calculated independently, then merged, the tracked objects, either in front of or behind the display, are also presented appropriately in whatever location relative to the display. The positional data is translated into appropriate locations within the camera and perspective matrices.

Augmented reality presents special challenges for display. The best and most cost-effective way to intelligently capture a physical space for augmented reality typically relies upon wide field of view cameras (E.g. 180 degree FOV cameras). These are relatively inexpensive and gather the most information about a physical space that may be shown on a display. And, they can be obtained with relatively high resolutions. However, they tend to create a "walleye" effect or a "bubble" effect whereby the world looks "curved" when viewed. So, the best way to combat this is to apply digital effects to alter the native image and "uncurve" it. Simultaneously, it may be preferable to provide a viewer, for example, on the movable display, only with a portion of the available perspective. This reduces the curved effect and allows the system to be more easily melded into any augmented reality objects, including controllers or individual hands. And, vision tracking or movement tracking can cause the display's viewing area to move within the available 180 degree field of view.

Figure 9:
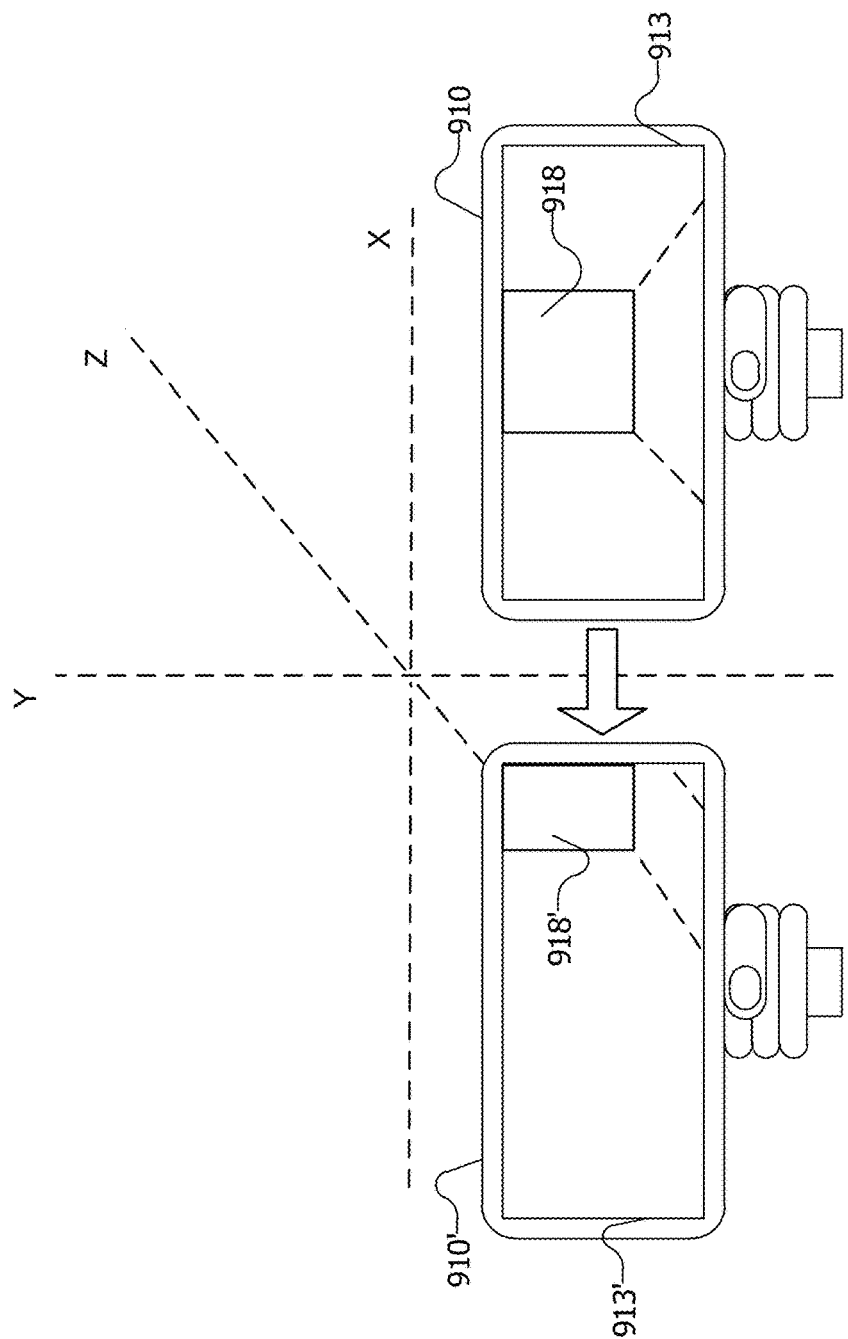
FIG. 9 is an example of translation of movement of a movable display device and corresponding changes to a three-dimensional, computer-generated environment.

FIG. 9 is an example of translation of movement of a movable display device and corresponding changes to a three-dimensional, computer-generated environment. For simplification of explanation, movement along only a single axis (the x-axis) is shown, but the same process takes place for shifts in any direction. Here, the movable display device 910 is held in such a way that an object 918 is visible directly in the center of the display 913.

Next, as the user moves the movable display device 910' to the left along the x-axis, the object 918' begins being obscured on the display 913'. This is because in this case, the user's head remained fixed, while the display moved. As a result, the perspective matrix changed and the movable display camera matrix also changed such that less of the object 918' is visible. This is similar to moving one's head in the physical world behind a corner. As a user's head moves behind that corner, less and less of the hallway beyond that corner is visible. In this way, the perspective is appropriate accounted for in the final render matrix as the movement of the movable display device is tracked.

Figure 10:
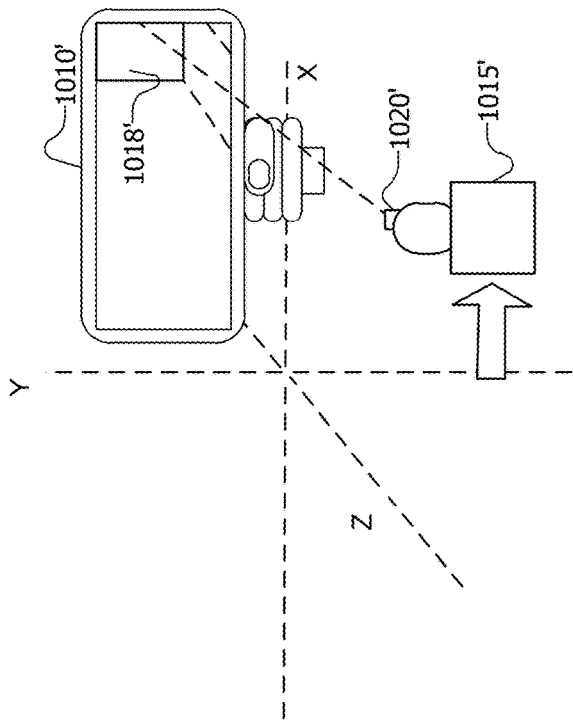
FIG. 10, made up of FIGS. 10A and 10B, is an example translation of detected head movement into corresponding changes to a three-dimensional, computer-generated environment.
Figure 10:
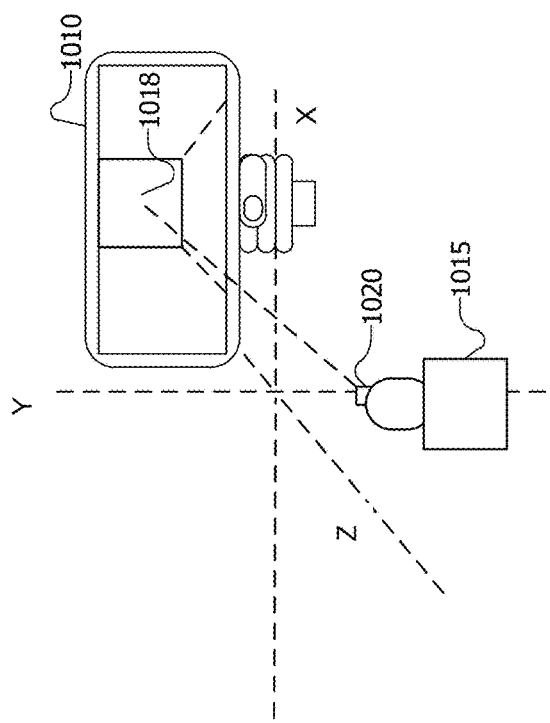

FIG. 10, made up of FIGS. 10A and 10B is an example translation of detected head movement into corresponding changes to a three-dimensional, computer-generated environment. Here, a similar situation is shown, however, a user's head moves from FIG. 10A to FIG. 10B while the movable display device 1010, 1010' remains fixed. In FIG. 10A, the user 1015's head mounted tracker 1020 is detected with a direct view of object 1018. In FIG. 10B, the user 1020' has moved to the right while the movable display device 1010' has remained fixed. As a result, the object 1018' is now less-visible. As with the corner example above, here the user's head has moved partially behind a virtual corner giving that user 1020' less visibility into the entirety of that virtual object 1018'. Here, the perspective matrix changed, but the camera matrix did not. Still, together, the resulting render matrix was sufficiently altered to change the computer-generated content on the movable display device 1010'.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system for viewing three-dimensional virtual reality content comprising:
    a movable display for rendering the three-dimensional virtual reality content for display;
    at least one tracker for tracking the movable display;
    a computing device configured to generate the three-dimensional virtual reality content;
    wherein the movable display is configured such that movement of the movable display relative to a viewer's head is detected using the at least one tracker is translated by the computing device into alteration of a viewing area of the three-dimensional virtual reality content corresponding to the movement of the movable display relative to the viewer's head, by:
        generating a matrix representative of a position and orientation of the movable display in physical space;
        generating a second matrix representative of a second position and a second orientation of the viewer's head;
        merging the matrix and the second matrix into a final matrix; and
        rendering the three-dimensional virtual reality content on the moveable display based upon the final matrix.

2. The system of claim 1 further comprising a head-mounted tracker for detecting the second position and the second orientation for the viewer's head.

3. The system of claim 1 wherein the second matrix is generated, in part, using a pair of offsets from the second position and the second orientation, the pair of offsets representative of a pair of eyes for the viewer's head; and wherein the three-dimensional virtual reality content includes two distinct perspectives of the three-dimensional virtual reality content, one for each of the pair of eyes based upon the pair of offsets.

4. The system of claim 1 wherein the computing device is further for:
    generating a third matrix representative of a third position and a third orientation of a second viewer's head;
    merging the third matrix into the final matrix; and
    rendering the three-dimensional virtual reality content on the movable display based upon the final matrix.

5. The system of claim 1 wherein rendering includes showing changes in the locations of objects displayed by an image on the moveable display in response to tracking the position and the second position; and wherein rendering includes generating only the three-dimensional virtual reality content that is visible from a viewer's perspective, based upon the position.

6. The system of claim 1 wherein the display operates as a window for viewing the three-dimensional virtual reality content from a perspective of a viewer based upon the final matrix; and wherein the three-dimensional virtual reality content combines objects within the physical space and computer generated objects.

7. The system of claim 1 wherein the movable display is a projector that projects the three-dimensional virtual reality content into a surface or in free space within the physical space based upon the final matrix.

8. A method viewing three-dimensional virtual reality content comprising:
   rendering the three-dimensional virtual reality content for display by a movable display;
   tracking movement of the movable display using at least one tracker; and
   translating the movement of the movable display relative to a viewer's head into alteration of a viewing area of the three-dimensional virtual reality content shown on by the movable display by
      generating a matrix representative of a position and orientation of the movable display;
      generating a second matrix representative of a second position and a second orientation of the viewer's head;
      merging the matrix and the second matrix into a final software matrix; and
      rendering the three-dimensional virtual reality content on the movable display based upon the final matrix.

9. The method of claim 8 further comprising detecting the second position and the second orientation for the viewer's head using a head-mounted tracker.

10. The method of claim 8 wherein the second matrix is generated, in part, using a pair of offsets from the second position and the second orientation, the pair of offsets representative of a pair of eyes for the viewer's head; and wherein the three-dimensional virtual reality content includes two distinct perspectives of the three-dimensional virtual reality content, one for each of the pair of eyes based upon the pair of offsets.

11. The method of claim 8 wherein rendering includes showing changes in the locations of objects displayed in an image on the moveable display in response to tracking the position and the second position; and wherein rendering includes generating only the three-dimensional virtual reality content that is visible from a viewer's perspective, based upon the position.

12. The method of claim 8 wherein the display operates as a window for viewing the three dimensional virtual reality content from a perspective of a viewer based upon the final matrix; and wherein the three-dimensional virtual reality content combines objects within the physical space and computer generated objects.

13. The method of claim 8 wherein the movable display is a projector that projects the three-dimensional virtual reality content into a surface or in free space within the physical space based upon the final matrix.

14. The method of claim 8 further comprising:
   generating a third matrix representative of a third position and a third orientation of a second viewer's head;
   merging the third matrix into the final matrix; and
   rendering the computer-generated content on the movable display based upon the final matrix.

15. Apparatus comprising software, which when executed by a processor will cause the processor to generate three-dimensional virtual reality content, the software for instructing the processor to:
   display the three-dimensional virtual reality content for display by a movable display;
   track movement of the movable display using at least one tracker; and
   translate the movement of the movable display relative to a viewer's head into alteration of a viewing area of the three-dimensional virtual reality content shown by the movable display by
      generating a matrix representative of a position and orientation of the movable display
      generating a second matrix representative of a second position and a second orientation of the viewer's head;
      merging the matrix and the second matrix into a final software matrix; and
      rendering the three-dimensional virtual reality content on the movable display based upon the final matrix.

16. The apparatus of claim 15 wherein the second matrix is generated, in part, using a pair of offsets from the second position and the second orientation, the pair of offsets representative of a pair of eyes for the viewer's head; and wherein the three-dimensional virtual reality content includes two distinct perspectives of the three-dimensional virtual reality content, one for each of the pair of eyes based upon the pair of offsets.

17. The apparatus of claim 15 wherein rendering includes showing changes in the locations of objects displayed in an image on the moveable display in response to tracking the position and the second position; and wherein rendering includes generating only the three-dimensional virtual reality content that is visible from a viewer's perspective, based upon the position.

18. The apparatus of claim 15 wherein the display operates as a window for viewing the three dimensional virtual reality content from a perspective of a viewer based upon the final matrix; and wherein the three-dimensional virtual reality content combines objects within the physical space and computer generated objects.

19. The apparatus of claim 15 wherein the movable display is a projector that projects the three-dimensional virtual reality content into a surface or in free space within the physical space based upon the final matrix.

20. The apparatus of claim 15 wherein the instructions further instruct the processor to:
   generate a third matrix representative of a third position and a third orientation of a second viewer's head;
   merge the third matrix into the final matrix; and
   render the computer-generated content on the movable display based upon the final matrix.

* * * * *